(12) United States Patent
Kishimoto et al.

(10) Patent No.: US 8,987,364 B2
(45) Date of Patent: Mar. 24, 2015

(54) TRANSPARENT FILM

(75) Inventors: Hirotsugu Kishimoto, Toyonaka (JP); Shinji Hashimoto, Kadoma (JP)

(73) Assignee: Panasonic Intellectual Property Management Co., Ltd., Osaka-shi (JP)

(*) Notice: Subject to any disclaimer, the term of this patent is extended or adjusted under 35 U.S.C. 154(b) by 824 days.

(21) Appl. No.: 13/254,906

(22) PCT Filed: Mar. 9, 2010

(86) PCT No.: PCT/JP2010/054277
§ 371 (c)(1),
(2), (4) Date: Nov. 1, 2011

(87) PCT Pub. No.: WO2010/104191
PCT Pub. Date: Sep. 16, 2010

(65) Prior Publication Data
US 2012/0058320 A1   Mar. 8, 2012

(30) Foreign Application Priority Data

Mar. 9, 2009   (JP) ................................. 2009-055712

(51) Int. Cl.
| | | |
|---|---|---|
| B32B 7/02 | (2006.01) | |
| B32B 27/04 | (2006.01) | |
| G02B 1/04 | (2006.01) | |
| C08G 59/32 | (2006.01) | |
| C08L 63/00 | (2006.01) | |
| G02F 1/1333 | (2006.01) | |

(52) U.S. Cl.
CPC .............. *G02B 1/04* (2013.01); *C08G 59/3218* (2013.01); *C08L 63/00* (2013.01); *G02F 2001/133302* (2013.01)
USPC .......................... 524/494; 428/212; 428/292.1

(58) Field of Classification Search
USPC ................................. 524/494; 428/212, 292.1
See application file for complete search history.

(56) References Cited

U.S. PATENT DOCUMENTS

| | | | |
|---|---|---|---|
| 5,034,493 A | 7/1991 | Tani et al. | |
| 8,198,381 B2 | 6/2012 | Nakanishi et al. | |
| 2004/0132867 A1 | 7/2004 | Shibahara et al. | |
| 2007/0117485 A1* | 5/2007 | Sakata et al. | 442/180 |
| 2007/0224412 A1 | 9/2007 | Hara et al. | |
| 2009/0117388 A1 | 5/2009 | Nakanishi et al. | |

FOREIGN PATENT DOCUMENTS

| | | | |
|---|---|---|---|
| JP | 2004-307851 A | 11/2004 | |
| JP | 2004-315690 A | 11/2004 | |
| JP | 2007-119630 A | 5/2007 | |
| JP | 2008-102351 A | 5/2008 | |
| WO | WO-2008/004630 A1 | 1/2008 | |
| WO | WO 2008004630 A1 * | 1/2008 | ............ C08F 290/06 |
| WO | WO-2009/104786 A1 | 8/2009 | |

OTHER PUBLICATIONS

International Search Report dated May 27, 2010 and Written Opinion of the International Searching Authority, issued for PCT/JP2010/054277.
Office Action dated Dec. 18, 2012, issued for the counterpart Taiwanese patent application and English translation thereof.

* cited by examiner

*Primary Examiner* — Ling Choi
*Assistant Examiner* — Chun-Cheng Wang
(74) *Attorney, Agent, or Firm* — Locke Lord LLP; James E. Armstrong, IV

(57) ABSTRACT

This invention relates to a transparent film including a glass fiber substrate made of glass fibers and impregnated with a resin composition in which a high refractive resin (a transparent resin) having refractive index higher than the glass fiber is mixed with a low refractive resin (a second transparent resin) having a refractive index lower than the glass fiber to have a resultant refractive index approximate to that of the glass fiber when cured, wherein the high refractive resin has a 3 or more-functional epoxy resin expressed by the following formula:

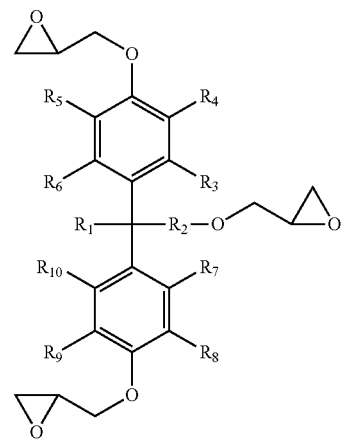

wherein $R_1$ is a hydrogen atom or methyl group, $R_2$ is a bivalent organic group, and $R_3$ to $R_{10}$ are respectively ones selected from a group consisting of a hydrogen atom, a substituent group, and a molecular chain containing epoxy group.

7 Claims, No Drawings

TRANSPARENT FILM

TECHNICAL FIELD

The present invention is directed to a transparent film.

BACKGROUND ART

As disclosed in Japanese Patent Publication JP 2004-307851 A, transparent films made of transparent resins and glass fiber substrates have been proposed as a replacement member for a glass plate utilized in a flat-panel display such as a liquid-crystal display, a plasma display, and an OELD (organic light emitting display).

In order to form these transparent films, for example, a resin composition is prepared by mixing a high refractive resin having refractive index higher than the glass fiber with a low refractive resin having refractive index lower than the glass fiber to have a resultant refractive index approximate to that of the glass fiber. Thereafter, prepregs are prepared by drying the glass fiber substrate impregnated with the prepared resin composition to be half-cured. The transparent film is formed by hot-pressing the prepregs.

A combination of the glass fibers and the matrix resin having refractive index compatible to the glass fiber can avoid undue refraction within the transparent film in order to assure good visibility as required for the display.

Generally, an epoxy resin is used as the resin composition for forming the transparent film. The resin composition is prepared by mixing different kinds of epoxy resins one having the refractive index higher than the glass fiber and the other having the refractive index lower than the glass fiber in order to approximate the refractive index of the resin composition to that of the glass fiber.

In the transparent film in which the epoxy resin is used as the resin composition, the epoxy resin having comparatively high glass transition temperature is used as the high refractive resin in order to improve heat resistance of the transparent film. However, the transparent film made of the epoxy resin having comparatively high glass transition temperature is likely to be discolored into yellow, when heated.

DISCLOSURE OF THE INVENTION

In view of the above insufficiency, the present invention has been accomplished to provide a transparent film capable of suppressing discoloration caused by heat, while retaining high transparency and high glass transition temperature.

The transparent film in accordance with the present invention includes a glass fiber substrate made of glass fibers and impregnated with a transparent resin composition made of a transparent resin. The characterizing feature of the present invention resides in that the transparent resin comprises a 3 or more-functional epoxy resin expressed by the following formula:

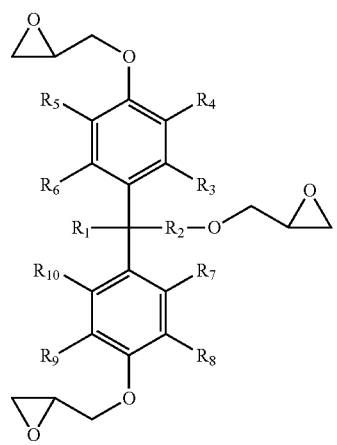

wherein $R_1$ is a hydrogen atom or methyl group, $R_2$ is a bivalent organic group, and $R_3$ to $R_{10}$ are respectively ones selected from a group consisting of a hydrogen atom, a substituent group, and a molecular chain containing epoxy group.

Preferably, the transparent resin comprises a 3-functional epoxy resin expressed by the following formula:

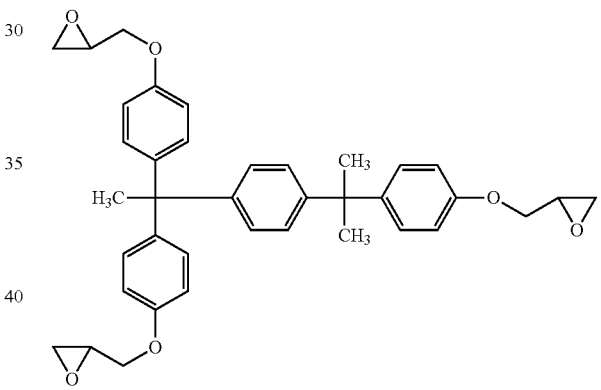

According to the present invention, the transparent film is capable of suppressing discoloration even when heated, in addition to share high transparency and high glass transition temperature.

Preferably, the transparent resin may include a cyanate-ester resin for increasing the glass transition temperature.

Preferably, the transparent resin composition may have a glass transition temperature of 220° C. or more after being cured so as to obtain the transparent film of superior heat resistance.

Preferably, the transparent resin composition may include a curing initiator of zinc octanoate for increasing the glass transition temperature.

Preferably, the transparent resin composition is prepared by mixing the transparent resin with a second transparent resin. The glass fiber substrate has refractive index of 1.55 to 1.57. Further, the transparent resin has refractive index of 1.58 to 1.63 after being cured, and the second transparent resin has refractive index of 1.47 to 1.53 after being cured. In this instance, transparency of the transparent film can be improved.

Alternatively, the glass fiber substrate is preferred to have refractive index of 1.50 to 1.53. Further, the transparent resin has refractive index of 1.54 to 1.63 after being cured, and the second transparent resin has refractive index of 1.47 to the refractive index of the glass fiber substrate after being cured. In this instance, coefficient of thermal expansion (coefficient of linear expansion) of the transparent film can be reduced, and optical properties (such as haze, and retardation) of the transparent film can be improved.

BEST MODE FOR CARRYING OUT THE INVENTION

Now, an explanation is made to a transparent film in accordance with a preferred embodiment of the present invention.

The transparent film includes a glass fiber substrate impregnated with a transparent resin composition (hereinafter called "resin composition") which is a mixture of a high refractive resin (a transparent resin) and a low refractive resin (a second transparent resin) having refractive index respectively greater and lower than the glass fibers of the substrate. The use of a multifunctional epoxy resin expressed by following formula 1 as the high refractive resin enables the transparent film to retain high transparency and high glass transition temperature, and further to prevent discoloration caused by heat.

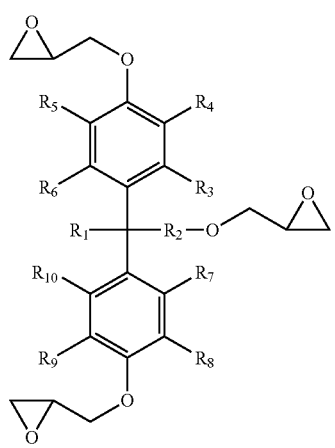

(Formula 1)

wherein $R_1$ is a hydrogen atom or methyl group, $R_2$ is a bivalent organic group, and $R_3$ to $R_{10}$ are respectively ones selected from a group consisting of a hydrogen atom, a substituent group, and a molecular chain containing epoxy group.

bivalent organic group of $R_2$ in formula 1 is selected from a phenylene-substituted or unsubstituted arylene group, and a group having a combined structure of a substituted or unsubstituted arylene group and a carbon atom or a carbon chain. The carbon atom or the carbon chain is selected from an arylene group such as a methyl-methylene group, and a dimethyl-methylene group, and a carbonyl group.

Preferably, bivalent organic group of $R_2$ is selected to constitute a glycidyl-oxy-phenyl group by combination of a phenylene group and a glycidyl-oxy group in the right side of the multi functional epoxy resin expressed by formula 1. In view of suppressing discoloration of the transparent film caused by heat, the bivalent organic group of $R_2$ prefers not to include a methylene group (—$CH_2$—) in a carbon atom or a carbon chain interposed between arylene groups.

A following structure in rectangular parenthesis in each formula 2 and 3 is exemplified as bivalent organic group of $R_2$.

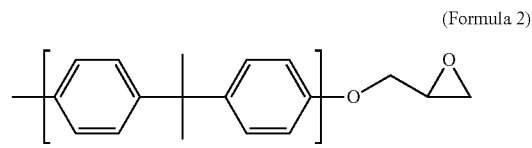

(Formula 2)

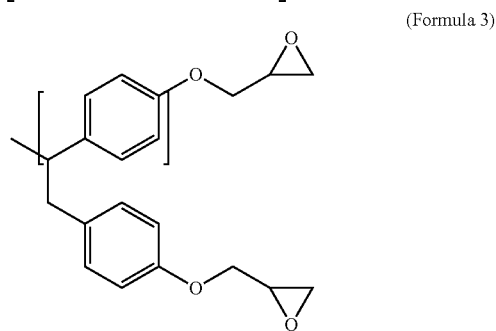

(Formula 3)

A substituent of $R_3$ to $R_{10}$ in formula 1 is selected from a hydrocarbon group such as a lower alkyl group and a different organic group, but is not limited thereto. A following structure in rectangular parenthesis in formula 4 is exemplified as a molecular chain, which includes an epoxy chain, of $R_3$ to $R_{10}$.

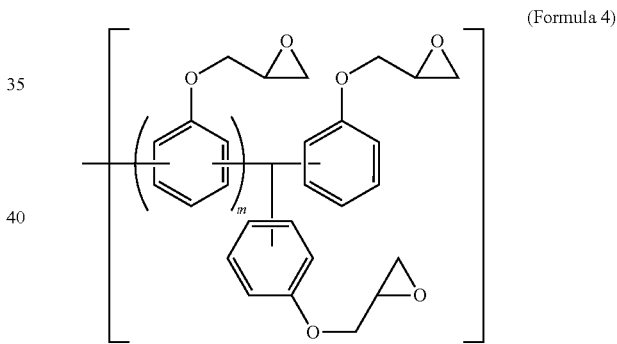

(Formula 4)

wherein, m is a positive integer.

The multifunctional resin expressed by above formula 1 is selected from multifunctional resins expressed by following formulae 5 to 7.

In the present embodiment, the high refractive resin is selected from a cyanate-ester resin in addition to the multifunctional resin expressed by above formula 1.

The cyanate-ester resin includes an aromatic cyanate-ester compound, for example, 2,2-bis(4-cyanatephenyl)propane, bis(3,5-dimethyl-4-cyanatephenyl)methane, 2,2-bis(4-cyanatephenyl)ethane, or their derivatives. One or different kinds of the compounds may be utilized to form the cyanate-ester resin.

The resulting cyanate-ester resin has a rigid molecular skeleton to have a high glass transition temperature when cured. Also, since the cyanate-ester resin is solid at room temperatures, it is easily dried to have a finger touch dryness after being impregnated in the glass fiber substrate together with the low refractive resin, thereby improving handling performance of prepregs each obtained by drying the glass substrate impregnated with the resin composition.

A content of the cyanate-ester in a varnish of the resin composition is preferably 10 to 40 wt %, and more preferably 25 to 35 wt %. The less content of the cyanate-ester resin causes insufficient improvement of the glass transition temperature. The excess content of the cyanate-ester resin causes shortage of solubility. As a result, the cyanate-ester is likely to be deposited from the varnish during impregnation or preservation.

The high refractive resin (such as, the multifunctional resin expressed by above formula 1, and a mixture of the cyanate-ester resin and the multifunctional resin expressed by above formula 1) is preferred to have refractive index in the range of 1.58 to 1.63. For example, when the glass fiber is selected to have refractive index of 1.562, the high refractive resin is preferred to have refractive index of about 1.6. In general, the high refractive resin is preferred to have refractive index in the range of n+0.03 to n+0.06 where n represents refractive index of the glass fiber.

In the present invention, the refractive index of the resin denotes the refractive index of the resin in its cured condition, and is defined under the test of ASTM D542.

In the present invention, the low refractive resin having refractive index lower than the glass fiber may be selected from any epoxy resin. The low refractive resin is preferred to have refractive index in the range of 1.47 to 1.53. For example, when the glass fiber is selected to have refractive index of 1.562, the low refractive resin is preferred to have refractive index of about 1.5. In general, the low refractive resin is preferred to have refractive index in the range of n−0.08 to n−0.04 where n represents refractive index of the glass fiber.

The low refractive resin is preferably selected from an epoxy resin including 1,2-epoxy-4-(2-cxiranyl)cyclohexane, and a hydrogenated bisphenol-epoxy resin.

The epoxy resin including 1,2-epoxy-4-(2-cxiranyl)cyclohexane can facilitate the manufacture of the transparent film, because it is solid at the room temperatures.

The hydrogenated bisphenol-epoxy resin may be one having bisphenol-A, bisphenol-F, or bisphenol-S, and is preferred to be one that is solid at room temperatures. Although a hydrogenated bisphenol-epoxy resin that is liquid at room temperatures may be utilized, it is usually dried only to finger touch tackiness when preparing the prepreg obtained by drying the glass substrate impregnated with the resin composition, and therefore lowering the handling performance of the prepreg.

Thus, in the transparent film of the present invention, the resin composition is prepared by mixing the high refractive resin having refractive index higher than the glass fiber with the low refractive resin having refractive index lower than the glass fiber, such that the resin composition has the refractive index approximate to the refractive index of the glass fibers. A mixing ration of the high refractive resin to the low refractive resin is suitably selected in order to give the resulting refractive index approximating to that of the glass fiber. The refractive index of the resin composition is desired to be as close to that of the glass fiber as possible, and is preferred to be in the range of n−0.02 to n+0.02, and is more preferred to be in the range of n−0.01 to n+0.01 where n represents the refractive index of the glass fiber.

The ratio of the high refractive resin to the low refractive resin is preferred to 40:60 to 55:45 by weight, when the glass fiber is E-glass being low cost and supplied with the same quality. The ratio out of the above mentioned range makes it difficult to adjust refractive index of many resins to refractive index of E-glass.

The resin composition is prepared to have a glass transition temperature of 220° centigrade or more. With the glass transition temperature of 220° or more, the resulting temperature film becomes highly heat resistant. Although the upper limit of the glass transition temperature is not particularly fixed, it is practically 280° centigrade.

Besides, in the present invention, the glass transition temperature was measured according to JIS C6481 TMA-method.

The resin composition may include a curing initiator (curing agent) which is selected from an organic metal salt. The organic metal salt may be a salt formed by a chemical reaction between an organic acid such as octanoic acid, stearic acid, acetylacetonate, naphthenic acid, or salicylic acid, and a metal such as Zn, Cu, or Fe. Although one or different kinds of salts may be used, zinc octanoate is particularly preferred for increasing the glass transition temperature. The incorporated amount of the organic metal salt (such as zinc octanoate) in the resin composition is preferred to be in the range of 0.01 to 0.1 PHR.

Alternatively, the curing initiator may be selected from a cationic curing agent for enhancing transparency of the resin. The cationic curing agent may be, for example, aromatic sulfonium salt, aromatic iodonium salt, ammonium salt, aluminum chelate, or boron trifluoride-amine complex. The incorporated amount of the cationic curing agent in the resin composition is preferred to be in the range of 0.2 to 3.0 PHR.

Further, the curing initiator may be selected from a curing catalyst including a tertiary amine such as triethyl amine and triethanol amine, 2-ethly-4-imidazole, 4-methyl-imidazole, or 2-ethyl-4-methyl-imidazole. The incorporated amount of the curing catalyst is preferred to be in the range of 0.5 to 5.0 PHR.

The resin composition is prepared from a mixture of the high refractive resin, the low refractive resin, and the curing initiator as necessary. The resultant resin composition may be diluted by adding a solvent as necessary to form a varnish. The solvent may be selected from benzene, toluene, xylene, methylethylketon, methylisobutylketon, acetone, methanol, ethanol, isopropyl alcohol, 2-butanol, ethyl acetate, butyl acetate, propylene glycol monomethyl ether, propylene glycol monomethyl ether acetate, diacetone alcohol, or N,N'-dimethylacetoamide.

The glass fiber is preferably selected from E-glass, NE-glass, or T-glass for improving anti-shock performance, although not limited thereto. The E-glass is referred to as a non-alkali glass widely available for use as resin reinforcing glass fibers, while the NE-glass is trade name of the glass having low dielectric constant and low dielectric loss properties available from "NITTOBO Incorporated".

The glass fiber is preferred to have a surface finish by a silane coupling agent generally used as a glass fiber treatment agent to improve anti-shock performance. The glass fiber is preferred to have refractive index of 1.55 to 1.57, and more preferably of 1.555 to 1.565. The use of the glass fiber having the refractive index in the above preferred range assures to provide the transparent film of excellent visibility. A glass fiber substrate is used in the form of either a woven fabric or unwoven fabric.

The glass fiber substrate is impregnated with the varnish of the resin composition, followed by being heated and dried to prepare the prepreg. The substrate is preferred to be dried at a temperature of 100° C. to 160° C. for 1 to 10 minutes.

Two or more sheets of the prepregs are superimposed on each other and are subject to heating and pressing for curing the resin composition to obtain the transparent film. The heating and pressing are preferably made at a raised temperature of 150° C. to 200° C. under a pressure of 1 MPa to 4 MPa for 10 to 120 minutes.

In the transparent film thus formed, the high refractive resin is polymerized with the low refractive resin to form a resin matrix which exhibits a high glass transition temperature, and is therefore responsible for obtaining the transparent film having superior heat-resistance.

In addition, since the high refractive resin and the low refractive resin are both excellent transparent materials, the resulting transparent film retains highly transparent characteristic. The glass fiber substrate are incorporated in the transparent film preferably by weight of 25% to 65% and more preferably of 35% to 60% to give enhanced anti-shock property by the reinforcing effect as well as sufficient transparency to the film. As an amount of the glass fiber increases excessively, the transparent film has larger asperity in its surface and lower transparency. By contrast, as the amount of the glass fiber decreases excessively, the transparent film has greater coefficient of linear expansion.

Two or more layers of the glass fiber substrates having a thickness of 10 μm to 50 μm are preferred to be stacked. The maximum number of the substrates is set to be 20 in a practical sense. Although it is normal to impregnate the individual substrates with the resin composition and dry the same to prepare a corresponding number of the prepregs, and to hot-press the stack of the prepregs for obtaining the transparent film, it is equally possible to impregnate the stack of the substrates with the resin composition and dry the resin impregnated stack to prepare a single prepreg, and to hot-press the prepreg into the transparent film.

EXAMPLES

The present invention is now explained by way of examples, although not limited thereto. In below Table 1, all incorporated resin amounts are denoted by parts by weight.

Following materials are utilized as a component of the transparent film in accordance with examples and comparative examples.

[The High Refractive Resin]

One or more of the following resins (i) to (viii) were utilized as the high refractive resin.

(i) a 3-functional epoxy resin having molecular structure expressed by formula 5 (available from Printec Co., Ltd. in the trade name of "TECHMORE VG3101", refractive index of 1.59).

(Formula 5)

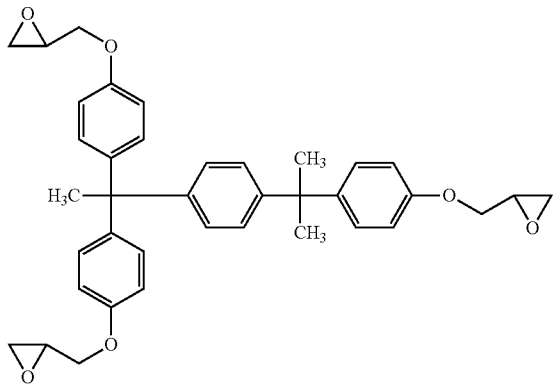 [SMILES: CC(C)(c1ccc(OCC2CO2)cc1)c1ccc(C(C)(c2ccc(OCC3CO3)cc2)c2ccc(OCC3CO3)cc2)cc1]

(ii) a multifunctional epoxy resin having molecular structure expressed by formula 6 (available from Nipponkayaku Co., Ltd. in the trade name of "EPPN-501", refractive index of 1.59)

(Formula 6)

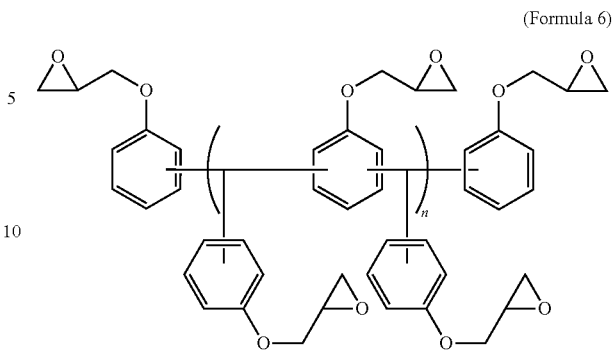

wherein n represents a positive integer.

(iii) a 4-functional epoxy resin having molecular structure expressed by formula 7 (available from Nipponkayaku Co., Ltd. in the trade name of "GTR-1800", refractive index of 1.59).

(Formula 7)

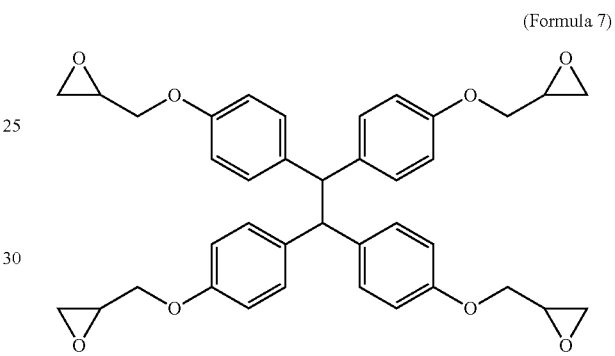

(iv) a cresol novolac multifunctional epoxy resin (available from DIC corporation in the trade name of "EPICLON N695", refractive index of 1.59).

(v) a phenol novolac multifunctional epoxy resin (available from DIC corporation in the trade name of "EPICLON N865", refractive index of 1.59).

(vi) a room temperature solid bisphenol-F 2-functional epoxy resin (available from Japan Epoxy Resins Co., Ltd. in the trade name of "JER4007P", refractive index of 1.59).

(vii) a room temperature solid bisphenol-A 2-functional epoxy resin (available from Japan Epoxy Resins Co., Ltd. in the trade name of "JER1006", refractive index of 1.59).

(viii) a room temperature solid cyanate-ester resin (available from Lonza in the trade name of "BADCy", 2,2-bis(4-cyanatephenyl)propane, refractive index of 1.60).

[The Low Refractive Resin]

The low refractive resin is a room temperature solid epoxy resin including 1,2-epoxy-4-(2-oxiranyl)cyclohexane (available from Daicel Chemical Industries, Ltd. in the trade name of "EHPE3150", refractive index of 1.51).

[The Curing Initiator]

The curing initiator is selected from the zinc octanoate and the cationic curing agent (available from Sanshin Chemical Industry Co., Ltd. in the trade name of "SI-150L", SbF6-sulfonium salt).

The high refractive resin, the low refractive resin, and the curing initiator are mixed to prepare a resin composition. Amounts of the high refractive resin, the low refractive resin, and the curing initiator are shown in Table 1 respectively. Then, 50 parts by weight of toluene and 50 parts by weight of methyl ethyl ketone were added to the resin composition. The resulting resin composition was stirred at 70° C. to prepare a varnish of the resin composition.

Subsequently, concerning Examples 1 to 6 and comparative Examples 1 to 4, a glass fiber cloth of 25 μm thickness (available from Asahi Kasei Corporation in the trade name of "1037", E-glass, refractive index of 1.56) was impregnated with the varnish of the resin composition followed by being heated at 150° C. for 5 minutes to remove the solvent and half-cure the resin, preparing the prepreg.

Concerning Example 7, a glass fiber cloth of 25 μm thickness (available from Nittobo in the trade name of "1037", T-glass, refractive index of 1.528) was impregnated with the varnish of the resin composition followed by being heated at 150° C. for 5 minutes to remove the solvent and half-cure the resin, preparing the prepreg.

Then, two sheets of the prepregs were superimposed and placed in a pressing machine so as to be heat-pressed at 170° C. under a pressure of 2 MPa for 15 minutes, thereby providing a 70 μm thick transparent film having a resin content of 63 wt %.

With regard to each of the transparent films obtained in Examples 1 to 7, and comparative Examples 1 to 3, evaluation was made in terms of the glass transition temperature and the haze factor (haze value or haze). The glass transition temperature was measured according to JIS C6481 TMA-method, and the haze factor was measured according to JIS K7136.

Moreover, with regard to each of the transparent films obtained in Examples 1 to 7, and comparative Examples 1 to 3, evaluation was made in terms of color difference Δb, coefficient of thermal expansion (CTE), and retardation. The color difference Δb is defined as difference between color of the transparent film after being heated at 170° C. for 30 minutes and color of the same transparent film before being heated. The color difference Δb was measured by use of a spectro-colorimeter (available from Konica Minolta Holdings, Inc. in the trade name of "CM-3600d"). The CTE was measured according to JIS C6481 TMA-method. In particular, the CTE in the range of 30 to 100° C. was measured according to tension mode by use of CTE measuring instrument (available from Seiko instruments Inc. in the trade name of "EXSTAR6000"). Each sample of the transparent films has length of 15 mm. The retardation was measured according to transparent mode by use of birefringence measuring instrument (available from Tokyo instruments Inc. in the trade name of "Abrio"). A measurement area of each transparent film was 11 mm×8 mm.

The results are shown in Table 1 below.

As seen in Table 1, Examples 1 to 7 using the multifunctional epoxy resin expressed by formula 1 (in particular, the multifunctional epoxy resin expressed by formulae 5 to 7) as the high refractive resin exhibit the high glass transition temperature, the high transparency, and the color difference Δb smaller than comparative Examples 1 to 4. Further, Examples 1 to 7 can suppress the discoloration by heat in comparison to comparative Examples 1 to 4. Therefore, the transparent film in accordance with the present invention is capable of preventing the discoloration by heat, while retaining high transparency and high glass transition temperature.

Notably, Examples 4 to 6 using a mixture of the multifunctional epoxy resin expressed by formula 1 and the cyanate-ester resin as the high refractive resin have the glass transition temperature higher than Examples 1 to 3 using the multifunctional epoxy resin expressed by formula 1 alone as the high refractive resin. Further, Examples 4 to 6 exhibit nearly no difference from Examples 1 to 3 in the transparency and the discoloration by heat.

By contrast, with regard to comparative Examples 1 and 2 using multifunctional epoxy resins having a structure except the structure expressed by formula 1, the color difference greater than Examples 1 to 7 and discoloration by heat are seen.

Moreover, with regard to comparative Examples 3 and 4 using the 2-functional epoxy resin as the high refractive resin, the glass transition temperature lower than Examples 1 to 7 is seen.

The invention claimed is:
1. A transparent film comprising:
a glass fiber substrate made of glass fibers and impregnated with a transparent resin composition made of a transparent resin,
wherein said transparent resin comprises a 3 or more-functional epoxy resin expressed by the following formula:

TABLE 1

| | | Examples | | | | | | | Comparative Examples | | | |
|---|---|---|---|---|---|---|---|---|---|---|---|---|
| | | 1 | 2 | 3 | 4 | 5 | 6 | 7 | 1 | 2 | 3 | 4 |
| High refractive resin | VG3101 | 52 | | | 22 | | | 11 | | | | |
| | EPPN-501 | | 52 | | | 22 | | | | | | |
| | GTR-1800 | | | 52 | | | 22 | | | | | |
| | N695 | | | | | | | | 56 | | | |
| | N865 | | | | | | | | | 56 | | |
| | JER4007P | | | | | | | | | | 56 | |
| | JER1006 | | | | | | | | | | | 56 |
| | BADCy | | | | 30 | 30 | 30 | | | | | |
| Low refractive resin | EHPE3150 | 48 | 48 | 48 | 48 | 48 | 48 | 89 | 44 | 44 | 44 | 44 |
| Curing initiator | zinc octanoate | | | | 0.02 | 0.02 | 0.02 | | | | | |
| | SI-150L | 1 | 1 | 1 | | | | 1 | 1 | 1 | 1 | 1 |
| Glass fiber | | E-glass | E-glass | E-glass | E-glass | E-glass | E-glass | T-glass | E-glass | E-glass | E-glass | E-glass |
| Glass fiber cloth thickness (μm) | | 25 | 25 | 25 | 25 | 25 | 25 | 25 | 25 | 25 | 25 | 25 |
| Staking number of glass fiber cloth | | 2 | 2 | 2 | 2 | 2 | 2 | 2 | 2 | 2 | 2 | 2 |
| Transparent film thickness (μm) | | 70 | 70 | 70 | 70 | 70 | 70 | 70 | 70 | 70 | 70 | 70 |
| Glass transition temperature (° C.) | | 200 | 210 | 213 | 240 | 250 | 255 | 210 | 210 | 200 | 108 | 116 |
| Haze factor | | 2.0 | 2.1 | 2.1 | 1.9 | 2.2 | 2.0 | 1.3 | 2.0 | 2.1 | 2.2 | 2.0 |
| Δb | | 0.5 | 0.4 | 0.4 | 0.4 | 0.3 | 0.4 | 0.3 | 4.3 | 4.5 | 4.1 | 0.9 |
| CTE (ppm) | | 16 | 16 | 16 | 16 | 16 | 16 | 13 | 16 | 16 | 16 | 16 |
| Retardation (nm) | | 1.5 | 1.4 | 1.4 | 1.6 | 1.5 | 1.5 | 0.8 | 1.4 | 1.4 | 1.4 | 1.0 |

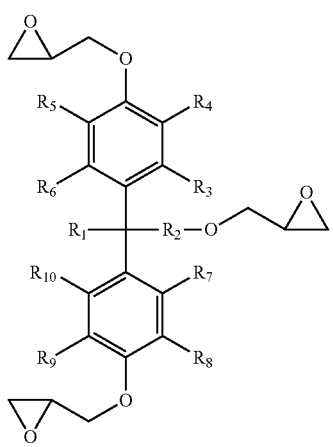

wherein $R_1$ is a hydrogen atom or methyl group, $R_2$ is a bivalent organic group, and $R_3$ to $R_{10}$ are respectively ones selected from a group consisting of a hydrogen atom, a hydrocarbon group, and a molecular chain containing epoxy group.

2. A transparent film as set forth in claim 1, wherein said transparent resin comprises a 3-functional epoxy resin expressed by the following formula:

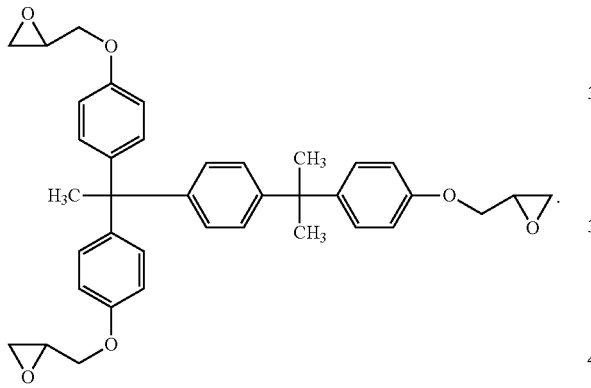

3. A transparent film as set forth in claim 1, wherein said transparent resin includes a cyanate-ester resin.

4. A transparent film as set forth in claim 1, wherein said transparent resin composition has a glass transition temperature of 220° C. or more after being cured.

5. A transparent film as set forth in claim 1, wherein said transparent resin composition includes a curing initiator of zinc octanoate.

6. A transparent film as set forth in claim 1, wherein
said transparent resin composition is prepared by mixing said transparent resin with a second transparent resin,
said glass fiber substrate has refractive index of 1.55 to 1.57,
said transparent resin has refractive index of 1.58 to 1.63 after being cured, and
said second transparent resin has refractive index of 1.47 to 1.53 after being cured.

7. A transparent film as set forth in claim 1, wherein
said transparent resin composition is prepared by mixing said transparent resin with a second transparent resin,
said glass fiber substrate has refractive index of 1.50 to 1.53,
said transparent resin has refractive index of 1.54 to 1.63 after being cured, and
said second transparent resin has refractive index of 1.47 to the refractive index of said glass fiber substrate after being cured.

* * * * *